(12) United States Patent
Ijiri et al.

(10) Patent No.: US 9,735,421 B2
(45) Date of Patent: Aug. 15, 2017

(54) METHOD FOR PRODUCING AMORPHOUS CARBON PARTICLES, AMORPHOUS CARBON PARTICLES, NEGATIVE ELECTRODE MATERIAL FOR LITHIUM ION SECONDARY BATTERY, AND LITHIUM ION SECONDARY BATTERY

(71) Applicant: JFE CHEMICAL CORPORATION, Tokyo (JP)

(72) Inventors: Makiko Ijiri, Tokyo (JP); Ryuta Haga, Tokyo (JP); Tetsuo Shiode, Tokyo (JP); Katsuhiro Nagayama, Tokyo (JP)

(73) Assignee: JFE CHEMICAL CORPORATION, Tokyo (JP)

( * ) Notice: Subject to any disclaimer, the term of this patent is extended or adjusted under 35 U.S.C. 154(b) by 138 days.

(21) Appl. No.: 14/304,660

(22) Filed: Jun. 13, 2014

(65) Prior Publication Data
US 2014/0295284 A1    Oct. 2, 2014

Related U.S. Application Data

(63) Continuation of application No. PCT/JP2012/007940, filed on Dec. 12, 2012.

(30) Foreign Application Priority Data

Dec. 16, 2011   (JP) ................................ 2011-275910
Oct. 24, 2012   (JP) ................................ 2012-234919

(51) Int. Cl.
*H01M 4/00*       (2006.01)
*C01B 31/00*      (2006.01)
(Continued)

(52) U.S. Cl.
CPC .......... *H01M 4/1393* (2013.01); *C01B 31/02* (2013.01); *H01M 4/043* (2013.01);
(Continued)

(58) Field of Classification Search
CPC .. H01M 4/1393; H01M 4/043; H01M 4/0471; H01M 4/133; H01M 4/583;
(Continued)

(56) References Cited

U.S. PATENT DOCUMENTS

2002/0076614 A1   6/2002   Yoon et al.
2006/0035146 A1   2/2006   Hayashi et al.
(Continued)

FOREIGN PATENT DOCUMENTS

JP   9-153359 A    6/1997
JP   10-83814 A    3/1998
(Continued)

OTHER PUBLICATIONS

International Search Report for International Application No. PCT/JP2012/007940, dated Feb. 19, 2013, 2 pages.

*Primary Examiner* — Harold Pyon
*Assistant Examiner* — Danny N Kang
(74) *Attorney, Agent, or Firm* — Ditthavong & Steiner, P.C.

(57) ABSTRACT

A method for producing amorphous carbon particles comprising includes adding and mixing graphite particles into a precursor of amorphous carbon and then cross-linking the precursor of amorphous carbon to obtain a first cross-linked product, or cross-linking a precursor of amorphous carbon and then adding and mixing graphite particles into the cross-linked precursor of amorphous carbon to obtain a second cross-linked product. Infusibility is imparted to the first or second cross-linked product to obtain an infusibilized product to which infusibility has been imparted. The infusibilized product is baked to obtain amorphous carbon particles. The amorphous carbon particles include the graphite particles and amorphous carbon which embeds the graphite particles.

14 Claims, 1 Drawing Sheet

(51) Int. Cl.
*H01M 4/1393* (2010.01)
*C01B 31/02* (2006.01)
*H01M 4/587* (2010.01)
*H01M 4/04* (2006.01)
*H01M 4/133* (2010.01)
*H01M 4/583* (2010.01)
*H01M 10/0525* (2010.01)

(52) U.S. Cl.
CPC ......... *H01M 4/0471* (2013.01); *H01M 4/133* (2013.01); *H01M 4/583* (2013.01); *H01M 4/587* (2013.01); *H01M 10/0525* (2013.01); *H01M 2220/20* (2013.01); *Y02E 60/122* (2013.01); *Y02P 70/54* (2015.11)

(58) Field of Classification Search
CPC ............. H01M 4/587; H01M 10/0525; H01M 2220/20; C01B 31/02; H01B 1/12; Y02E 60/122
USPC ....................................................... 252/500
See application file for complete search history.

(56) References Cited

U.S. PATENT DOCUMENTS

| | | |
|---|---|---|
| 2006/0147799 A1 | 7/2006 | Hayashi et al. |
| 2008/0044656 A1* | 2/2008 | Ko .................. C01B 31/04 428/403 |

FOREIGN PATENT DOCUMENTS

| JP | 10-308220 | * | 11/1998 |
|---|---|---|---|
| JP | 10-308220 A | | 11/1998 |
| JP | 11-329436 A | | 11/1999 |
| JP | 2003-100294 A | | 4/2003 |
| JP | 2003-173774 A | | 6/2003 |
| JP | 2003173774 A | * | 6/2003 |
| JP | 2004-273424 A | | 9/2004 |
| JP | 2005-123175 A | | 5/2005 |
| JP | 2011-3332 A | | 1/2011 |

* cited by examiner

METHOD FOR PRODUCING AMORPHOUS CARBON PARTICLES, AMORPHOUS CARBON PARTICLES, NEGATIVE ELECTRODE MATERIAL FOR LITHIUM ION SECONDARY BATTERY, AND LITHIUM ION SECONDARY BATTERY

CROSS-REFERENCE TO RELATED APPLICATIONS

The present application is a continuation application of International Application No. PCT/JP2012/007940, filed Dec. 12, 2012, which claims priority to Japanese Patent Application No. 2011-275910, filed Dec. 16, 2011 and to Japanese Patent Application No. 2012-234919, filed Oct. 24, 2012. The contents of these applications are incorporated herein by reference in their entirety.

BACKGROUND OF THE INVENTION

Field of the Invention

The present invention relates to a method for producing amorphous carbon particles, amorphous carbon particles, a negative electrode material for a lithium ion secondary battery, and a lithium ion secondary battery.

Discussion of the Background

Conventionally, mainly from the viewpoint of price and weight reduction, nickel metal hydride batteries have been used as rechargeable batteries for hybrid cars. In order to further reduce weight, the use of lithium ion secondary batteries which have a high voltage and a high energy density has been anticipated.

Regarding batteries for cars driven by batteries only, such as electric cars, in order to ensure a sufficient distance per charge, the use of materials having a high energy density, and graphite-based materials in negative electrodes, has been widely studied.

On the other hand, in a system in which the volume to be loaded in a car is small and it is necessary to regenerate energy during deceleration by braking, such as in a battery for a hybrid car, there has been a demand for batteries having high charge/discharge specific output density, and use of amorphous carbon particles, a representative example of which is hard carbon, has been studied. Background art relating to the amorphous carbon particles is described in, for example, Japanese Unexamined Patent Application Publication No. 3-252053, Japanese Unexamined Patent Application Publication No. 6-89721, Japanese Unexamined Patent Application Publication No. 8-115723, and Japanese Unexamined Patent Application Publication No. 9-153359.

Amorphous carbon particles have a low true specific gravity compared with graphite particles (i.e., when measured in accordance with a method for measuring true specific gravity using butanol, the true specific gravity of a graphite-based material is about 2.23, while the true specific gravity of common hard carbon is low at 1.5 to 1.6 although depending on the material), and amorphous carbon particles are hard particles. Therefore, it is difficult to improve the electrode density, and the electrode press formability may degrade in some cases.

Furthermore, amorphous carbon particles tend to have low conductivity compared with graphite particles. Improvement in conductivity is believed to be an effective measure to improve charge/discharge, input/output characteristics per second in which electron conductivity mainly dominates.

Furthermore, in the process of fabricating an electrode using amorphous carbon particles, it is also conceivable to add afterwards graphite particles having good conductivity, as a conductive auxiliary material. However, for example, in the case where an electrolyte solution containing propylene carbonate which has excellent low-temperature characteristics and which does not solidify even in cold climates is used, reaction (decomposition reaction) occurs between graphite particles and the electrolyte solution, and charging is not performed, adversely affecting the battery performance.

SUMMARY OF THE INVENTION

According to one aspect of the present invention, a method for producing amorphous carbon particles comprising includes adding and mixing graphite particles into a precursor of amorphous carbon and then cross-linking the precursor of amorphous carbon to obtain a first cross-linked product, or cross-linking a precursor of amorphous carbon and then adding and mixing graphite particles into the cross-linked precursor of amorphous carbon to obtain a second cross-linked product. Infusibility is imparted to the first or second cross-linked product to obtain an infusibilized product to which infusibility has been imparted. The infusibilized product is baked to obtain amorphous carbon particles. The amorphous carbon particles include the graphite particles and amorphous carbon which embeds the graphite particles.

According to another aspect of the present invention, a method for producing amorphous carbon particles includes adding and mixing graphite particles into a precursor of amorphous carbon and then cross-linking the precursor of amorphous carbon to obtain a first cross-linked product, or cross-linking a precursor of amorphous carbon and then adding and mixing graphite particles into the cross-linked precursor of amorphous carbon to obtain a second cross-linked product. The first or second cross-linked product is subjected to mechanochemical treatment to obtain a mechanochemically treated product. Infusibility is imparted to the mechanochemically treated product to obtain an infusibilized product. The infusibilized product is baked to obtain amorphous carbon particles. The amorphous carbon particles include the graphite particles and amorphous carbon which embeds the graphite particles.

According to further aspect of the present invention, a method for producing amorphous carbon particles includes adding and mixing graphite particles into a precursor of amorphous carbon and then cross-linking the precursor of amorphous carbon to obtain a first cross-linked product, or cross-linking a precursor of amorphous carbon and then adding and mixing graphite particles into the cross-linked precursor of amorphous carbon to obtain a second cross-linked product. Infusibility is imparted to the first or second cross-linked product to obtain an infusibilized product. The infusibilized product is subjected to mechanochemical treatment to obtain a mechanochemically treated product. The mechanochemically treated product is baked to obtain amorphous carbon particles. The amorphous carbon particles include the graphite particles and amorphous carbon which embeds the graphite particles.

According to further aspect of the present invention, amorphous carbon particles include graphite particles, and amorphous carbon which embeds the graphite particles.

According to further aspect of the present invention, a negative electrode material for a lithium ion secondary battery includes the amorphous carbon particles.

According to further aspect of the present invention, a lithium ion secondary battery includes a negative electrode material which includes the amorphous carbon particles.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
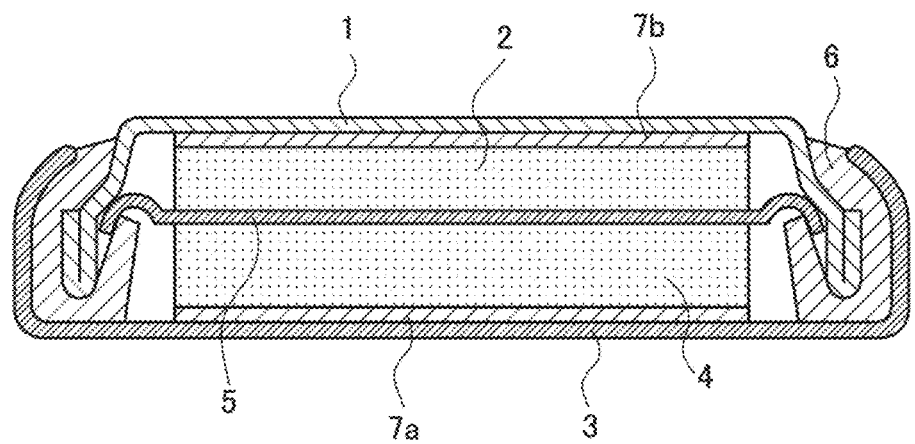
FIG. 1 is a cross-sectional view showing a coin-type secondary battery for evaluation.

Embodiments of the present invention provide the following (1) to (11).

(1) A method for producing amorphous carbon particles including a step of adding and mixing graphite particles into a precursor of amorphous carbon, and then performing cross-linking treatment to obtain a first cross-linked product, or a step of subjecting a precursor of amorphous carbon to cross-linking treatment, and then adding and mixing graphite particles thereinto to obtain a second cross-linked product; an infusibility-imparting treatment step of subjecting the first or second cross-linked product to infusibility-imparting treatment to obtain a product subjected to infusibility-imparting treatment (also referred to as "an infusibilized product"); and a step of baking the product subjected to infusibility-imparting treatment to obtain amorphous carbon particles which contain the graphite particles.

(2) A method for producing amorphous carbon particles including a step of adding and mixing graphite particles into a precursor of amorphous carbon, and then performing cross-linking treatment to obtain a first cross-linked product, or a step of subjecting a precursor of amorphous carbon to cross-linking treatment, and then adding and mixing graphite particles thereinto to obtain a second cross-linked product; a mechanochemical treatment step of subjecting the first or second cross-linked product to mechanochemical treatment to obtain a mechanochemically treated product; an infusibility-imparting treatment step of subjecting the mechanochemically treated product to infusibility-imparting treatment to obtain a product subjected to infusibility-imparting treatment; and a step of baking the product subjected to infusibility-imparting treatment to obtain amorphous carbon particles which contain the graphite particles.

(3) A method for producing amorphous carbon particles including a step of adding and mixing graphite particles into a precursor of amorphous carbon, and then performing cross-linking treatment to obtain a first cross-linked product, or a step of subjecting a precursor of amorphous carbon to cross-linking treatment, and then adding and mixing graphite particles thereinto to obtain a second cross-linked product; an infusibility-imparting treatment step of subjecting the first or second cross-linked product to infusibility-imparting treatment to obtain a product subjected to infusibility-imparting treatment; a mechanochemical treatment step of subjecting the product subjected to infusibility-imparting treatment to mechanochemical treatment to obtain a mechanochemically treated product; and a step of baking the mechanochemically treated product to obtain amorphous carbon particles which contain the graphite particles.

(4) The method for producing amorphous carbon particles according to any one of (1) to (3), in which the addition amount of the graphite particles is 1% to 50% by mass relative to the precursor of amorphous carbon.

(5) The method for producing amorphous carbon particles according to any one of (1) to (4), in which the average particle size of the graphite particles is 1 to 25 μm.

(6) Amorphous carbon particles characterized by containing graphite particles.

(7) The amorphous carbon particles according to (6), characterized in that the true specific gravity of the amorphous carbon particles is 1.600 to 1.700.

(8) The amorphous carbon particles according to (6) or (7), in which the content of the graphite particles is 1% to 50% by mass.

(9) The amorphous carbon particles according to any one of (6) to (8), in which the average particle size of the graphite particles is 1 to 25 μm.

(10) A negative electrode material for a lithium ion secondary battery including the amorphous carbon particles according to any one of (6) to (9).

(11) A lithium ion secondary battery in which the amorphous carbon particles according to any one of (6) to (9) are used as a negative electrode material.

According to the embodiment of the present invention, it is possible to obtain amorphous carbon particles having excellent press formability and conductivity while suppressing reactivity with an electrolyte solution. The embodiments will now be described with reference to the accompanying drawings, wherein like reference numerals designate corresponding or identical elements throughout the various drawings.

[Method for Producing Amorphous Carbon Particles]

The method for producing amorphous carbon particles according to the embodiment of the present invention (hereinafter, may be simply referred to as the "production method of the embodiment of the present invention") roughly includes a step of adding and mixing graphite particles into a precursor of amorphous carbon, and then performing cross-linking treatment to obtain a first cross-linked product, or a step of subjecting the precursor of amorphous carbon to cross-linking treatment and then adding and mixing the graphite particles thereinto to obtain a second cross-linked product; and a step of subjecting the first or second cross-linked product to infusibility-imparting treatment, and then performing baking to obtain amorphous carbon particles which contain the graphite particles. Furthermore, mechanochemical treatment may be performed before or after the infusibility-imparting treatment.

The production method of the embodiment of the present invention will be described in detail below.

[Precursor of Amorphous Carbon]

The precursor of amorphous carbon used in the embodiment of the present invention is not particularly limited, and any known precursor can be used. Examples thereof include pitches, such as a coal-based pitch and a petroleum-based pitch; resins, such as a phenolic resin and a furan resin; mixtures of a pitch and a resin; and the like. Above all, from the viewpoint of economics and the like, a pitch, such as a coal-based pitch or a petroleum-based pitch, is preferable. Specific examples of the coal-based pitch include coal-tar pitch, coal-liquefied pitch, and the like.

In the case where a pitch is used, from the viewpoint of increasing the battery capacity, the quinoline insoluble (QI) content is preferably 0% to 2% by mass, although not particularly limited.

[Graphite Particles]

The graphite particles used in the embodiment of the present invention are not particularly limited. Examples thereof include natural graphite; artificial graphite; composite particles in which these graphites are coated with amorphous carbon; and the like. Furthermore, examples of natural graphite include scaly graphite, flake graphite, spheroidal graphite, earthy graphite, and the like. Above all, flake graphite is preferable. Examples of artificial graphite include a product obtained by graphitizing mesocarbon microbeads, a product obtained by pulverizing and graphitizing a bulk mesophase, a product obtained by graphitizing mesophase carbon fibers, a product obtained by graphitizing highly crystalline needle coke, and the like. Artificial graphite made from mesocarbon microbeads can be produced, for example, by a method described in Japanese Patent No. 3866452.

The average particle size of the graphite particles, which depends on the particle size of final amorphous carbon particles, is preferably 1 to 25 μm, and more preferably 3 to 15 μm. When the particle size of the graphite particles is excessively small, mixing becomes difficult, and the graphite particles are unlikely to be contained. When the particle size is excessively large, the probability of exposure of edge faces of the graphite particles to the outside increases. When the particle size is in the range described above, the graphite particles are likely to be contained, and the possibility of exposure is reduced, thus enhancing the advantage of the embodiment of the present invention.

Note that, in the embodiment of the present invention, the average particle size of the graphite particles is measured by a laser diffraction particle size analyzer.

[Adding/Mixing]

According to an embodiment of the production method of the present invention, first, graphite particles are added and mixed into a precursor of amorphous carbon (hereinafter, may be simply referred to as the "precursor"). The method therefor is not particularly limited. For example, a method may be used in which, using an autoclave equipped with a stirrer, the precursor is heated to a fluid state, then the graphite particles are gradually added thereinto under stirring, and stirring is continued until uniform mixing is achieved.

In this case, the addition amount of the graphite particles, which depends on the shape and crystallinity of the graphite particles, is preferably, 1% to 50% by mass, and more preferably 5% to 20% by mass, relative to the precursor. When the addition amount is excessively large, the probability that all of the graphite particles can be contained decreases. When the addition amount is excessively small, it may be difficult to obtain the effect of improving conductivity. When the addition amount is in the range described above, almost all of the graphite particles can be contained, thus enhancing the effect of improving conductivity.

[Cross-Linking Treatment]

Next, by performing cross-linking treatment, a cross-linked product (first cross-linked product) is obtained. Examples of the method for performing cross-linking treatment include a method using an air-blowing reaction; a dry method using an oxidizing gas (air, oxygen); a wet method using an aqueous solution of nitric acid, sulfuric acid, hypochlorous acid, a mixed acid, or the like; and others. Above all, a method using an air-blowing reaction is preferable.

The air-blowing reaction is a reaction in which, for example, by blowing an oxidizing gas (e.g., air, oxygen, ozone, or a mixture thereof) into the reaction mixture under heating, the softening point is increased. In accordance with the air-blowing reaction, for example, it is possible to obtain a cross-linked product (e.g., air-blown pitch) having a high softening point of 200° C. or higher.

Japanese Unexamined Patent Application Publication No. 9-153359 describes that the air-blowing reaction is a reaction in a liquid-phase state, and it is known that incorporation of oxygen atoms into a carbon material hardly occurs compared with a cross-linking treatment in a solid-phase state.

Furthermore, in the air-blowing reaction, a reaction mainly consisting of an oxidative dehydration reaction proceeds, and polymerization proceeds by biphenyl-type cross-linking. By the subsequent imparting of infusibility and baking (which will be described later), it is considered that carbon particles which have a non-oriented, three-dimensional structure with the cross-linked portions being dominant and with many voids in which lithium is absorbed remaining are obtained.

The conditions for the air-blowing reaction are not particularly limited. When the temperature is excessively high, mesophases generate, and when the temperature is low, the reaction rate decreases. For these reasons, the reaction temperature is preferably 280° C. to 420° C., and more preferably 320° C. to 380° C. Furthermore, the blowing amount of the oxidizing gas is, in the case of air, preferably 0.5 to 15 L/min, and more preferably 1.0 to 10 L/min, for 1,000 g of pitch. The reaction pressure is not particularly limited, and may be a normal pressure, a reduced pressure, or an increased pressure.

Furthermore, according to another embodiment of the production method of the present invention, a cross-linked product (second cross-linked product) may be obtained by, first, subjecting a precursor of amorphous carbon to cross-linking treatment, and then adding and mixing graphite particles thereinto. As the methods for cross-linking treatment and adding and mixing, the same methods as those described above may be used. Furthermore, the second cross-linked product may be further subjected to cross-linking treatment.

Hereinafter, the first cross-linked product and the second cross-linked product may be collectively simply referred to as the "cross-linked product".

The softening point of the cross-linked product thus obtained is preferably 200° C. to 400° C., and more preferably 250° C. to 350° C., from the viewpoint of ease of infusibility-imparting treatment.

[Pulverization]

The resulting cross-linked product is preferably pulverized to adjust the particle size. The pulverization method is not particularly limited, and any known method can be used. The average particle size after pulverization is, for example, preferably 1 to 50 μm, and more preferably 2 to 15 μm. Furthermore, such pulverization may be performed on the product subjected to infusibility-imparting treatment, which will be described later.

Note that, in the embodiment of the present invention, the average particle size after pulverization is measured by a laser diffraction particle size analyzer.

[Infusibility-Imparting Treatment]

Next, the appropriately pulverized cross-linked product is subjected to infusibility-imparting treatment to obtain a product subjected to infusibility-imparting treatment. The infusibility-imparting treatment is a kind of cross-linking treatment (oxidation treatment) performed in a solid-phase state. Oxygen is incorporated into the structure of the cross-linked product, and since cross-linking further proceeds, the product becomes difficult to melt at a high temperature.

The method for infusibility-imparting treatment is not particularly limited. Examples thereof include a dry method using an oxidizing gas (air, oxygen); a wet method using an aqueous solution of nitric acid, sulfuric acid, hypochlorous acid, a mixed acid, or the like; and others. Above all, a dry method using an oxidizing gas is preferable.

As the treatment temperature of the infusibility-imparting treatment, preferably, a temperature equal to or lower than the softening point of the cross-linked product is selected. Furthermore, in the case where batch processing is performed, the heating rate is preferably 5° C./hr to 100° C./hr, and more preferably 10° C./hr to 50° C./hr, from the viewpoint of further preventing fusion.

The other treatment conditions of the infusibility-imparting treatment are not particularly limited. For example, the blowing amount of the oxidizing gas, as compressed air, is preferably 1.0 to 20 L/min, and more preferably 2.0 to 10 L/min. The reaction pressure is not particularly limited, and may be a normal pressure, a reduced pressure, or an increased pressure.

The oxygen amount in the product subjected to infusibility-imparting treatment obtained by the infusibility-imparting treatment is preferably 3% to 20% by mass, and more preferably 5% to 15% by mass, from the viewpoint of preventing fusion during baking.

[Baking]

After the infusibility-imparting treatment, by baking the product subjected to infusibility-imparting treatment in a reduced pressure or in an inert gas atmosphere, such as nitrogen, carbon particles are obtained. In this case, the heating rate is preferably 50° C./hr to 150° C./hr, and more preferably 80° C./hr to 120° C./hr. Furthermore, the final temperature (baking temperature) is preferably 1,000° C. to 1,300° C., and more preferably 1,000° C. to 1,200° C.

Furthermore, in the embodiment of the present invention, the cross-linked product or the product subjected to infusibility-imparting treatment may be subjected to mechanochemical treatment. Thereby, since particles rub together, the particles obtained after baking have a rounded shape with corners being removed. Thus, the electrode density is improved, and the press formability can be enhanced.

The mechanochemical treatment refers to a treatment in which compressive force and shear force are applied at the same time to particles. Although the compressive force and shear force applied are larger than those applied in general stirring, these mechanical stresses are desirably applied to the surfaces of particles without breaking the particles.

The apparatus used in the mechanochemical treatment may be any apparatus that can apply compressive force and shear force at the same time to particles. Examples of the apparatus that can be used include a pressure kneader, a mixer such as a twin-roll mixer, a rotary ball mill, a hybridization system (manufactured by Nara Machinery Co., Ltd.), a Mechano Micros (manufactured by Nara Machinery Co., Ltd.), and a mechanofusion system (manufactured by Hosokawa Micron Corporation).

When the intensity of shear force, compressive force, and the like of the mechanochemical treatment is low, surface treatment is not performed sufficiently, and the effect of improving press formability is low. Therefore, the intensity is adjusted in accordance with the conditions, such as the average particle size and the corner shape. Furthermore, when the intensity of the treatment is excessively high, formation of new surfaces and generation of fine powder due to breakage of particles may cause adverse effects, such as degradation of battery characteristics. Therefore, a moderate intensity is selected.

[Amorphous Carbon Particles]

Figure 2:
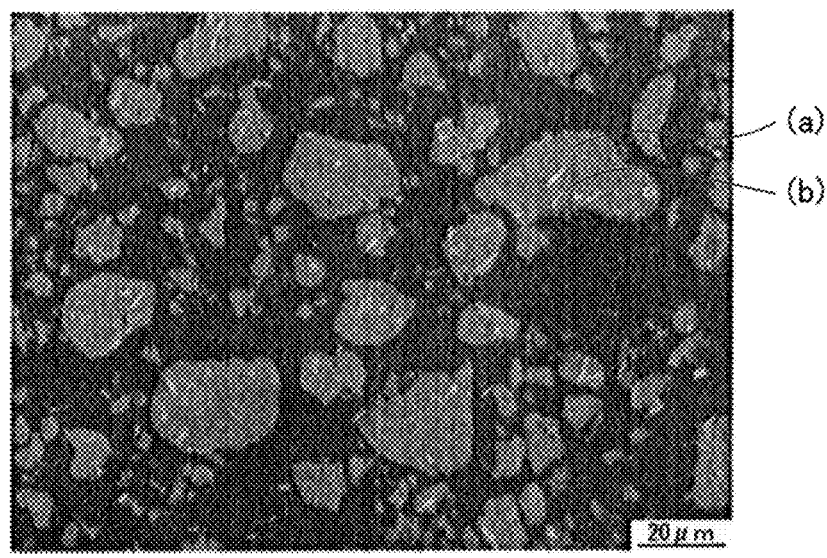
FIG. 2 is a polarization microphotograph showing a cross-section of amorphous carbon particles.

The amorphous carbon particles of the embodiment of the present invention are obtained by the production method of the embodiment of the present invention described above or the like, and are amorphous carbon particles containing graphite particles. FIG. 2 is a polarization microphotograph showing a cross-section of amorphous carbon particles of the embodiment of the present invention. The amorphous carbon particles were embedded in a resin, a cross-section was polished, and then this polarization microphotograph was taken. In the photograph shown in FIG. 2, whitish gray portions (a) represent amorphous carbon particles, and white needle-like portions (b) represent graphite particles (flaky). A black portion surrounding the whitish gray portions (a) represents the resin in which the amorphous carbon particles are embedded.

In the amorphous carbon particles of the embodiment of the present invention, by embedded graphite particles which have a lower resistance and a higher true specific gravity than amorphous carbon, it is possible to decrease the resistance of particles as a whole to improve conductivity, and it is possible to increase the true specific gravity of particles as a whole to improve the electrode density and to enhance press formability.

Furthermore, at the same time, by embedded graphite particles so as not to be exposed to the outer surface, it is possible to suppress reaction with an electrolyte solution. Accordingly, for example, it is possible to use an electrolyte solution containing propylene carbonate which has excellent low-temperature characteristics and which does not solidify even in low temperature, and it is possible to suppress adverse effects on the battery performance, such as poor durability and a decrease in conducting paths due to expansion and contraction.

Such amorphous carbon particles of the embodiment of the present invention cannot be obtained in the case where graphite particles are added and mixed into a product subjected to infusibility-imparting treatment which is obtained by cross-linking a raw material before being subjected to cross-linking treatment without containing graphite particles therein, and then performing infusibility-imparting treatment.

In the amorphous carbon particles of the embodiment of the present invention, the content of the graphite particles is preferably 1% to 50% by mass, and more preferably 5% to 20% by mass, because of a higher effect of improving conductivity.

The average particle size of the amorphous carbon particles of the embodiment of the present invention, which depends on the characteristics of the battery used, is preferably 1 to 25 μm, and more preferably 2 to 15 μm, from the viewpoint of improving input/output characteristics. The average particle size can be adjusted to such an extent that embedded graphite particles are not markedly exposed.

Note that, in the embodiment of the present invention, the average particle size of the amorphous carbon particles is measured by a laser diffraction particle size analyzer.

The specific surface of the amorphous carbon particles of the embodiment of the present invention is preferably 10 $m^2/g$ or less, more preferably 0.5 to 8 $m^2/g$, still more preferably 1.0 to 4 $m^2/g$, and most preferably 1.2 to 3.5 $m^2/g$ from the viewpoint of suppressing reactivity with an electrolyte solution.

Note that, in the embodiment of the present invention, the specific surface is determined by the BET method using adsorption of nitrogen gas.

The amorphous carbon particles of the embodiment of the present invention preferably have an average lattice spacing $d_{002}$ of (002) plane determined by X-ray diffraction (hereinafter, may be simply referred to as the "average lattice spacing $d_{002}$") of 0.350 nm or more from the viewpoint of excellent discharge capacity and cycle life.

Note that, in the embodiment of the present invention, the average lattice spacing d002 is determined by a method in which, using a CuKα ray as an X-ray and high-purity silicon as a standard substance, the diffraction peak of the (002) plane of amorphous carbon particles is measured, and calculation is performed from the position of the peak. The calculation method is in accordance with the Gakushin method (measurement method established by the 17th committee of Japan Society for the Promotion of Science), and specifically, the method described in "Carbon fibers" [Sugio Otani, pp. 733-742 (March 1986), Kindaihenshu-sha].

The true specific gravity of the amorphous carbon particles of the embodiment of the present invention is preferably 1.600 g/cm$^3$ or more, more preferably 1.600 to 1.700 g/cm$^3$, still more preferably 1.600 to 1.690 g/cm$^3$, and most preferably 1.620 to 1.685 g/cm$^3$, because the electrode density further improves as the true specific gravity value increases.

Note that, in the embodiment of the present invention, the true specific gravity is determined by a liquid phase substitution method by a pycnometer, using butanol, in accordance with JIS R 7222:1997 (Test methods for physical properties of graphite materials).

Next, description will be made on a lithium ion secondary battery in which amorphous carbon particles of the embodiment of the present invention are used as a negative electrode material (hereinafter, may also be referred to as the "lithium ion secondary battery of the embodiment of the present invention").

[Lithium Ion Secondary Battery]

A lithium ion secondary battery generally includes, as main battery elements, a negative electrode, a positive electrode, and a nonaqueous electrolyte solution. The positive and negative electrodes are each composed of a substance (as a layered compound), a compound, or a cluster capable of absorbing lithium ions. In the charging/discharging process, lithium ions move in and out of the electrodes between layers. It has a battery mechanism in which lithium ions are doped into the negative electrode during charging and dedoped from the negative electrode during discharging.

The lithium ion secondary battery of the embodiment of the present invention is not particularly limited except that the amorphous carbon particles of the embodiment of the present invention are used as a negative electrode material. Regarding the other battery elements, battery elements generally used for lithium ion secondary batteries are used.

[Negative Electrode]

A method for producing a negative electrode from the amorphous carbon particles of the embodiment of the present invention is not particularly limited, and a common production method can be employed. In the production process of the negative electrode, a negative electrode mixture prepared by adding a binder to the amorphous carbon particles of the embodiment of the present invention can be used. Binders having chemical stability and electrochemical stability against electrolytes are preferably used as the binder. The binder is usually preferably used in an amount of about 1% to 20% by mass relative to the total amount of the negative electrode mixture. As the binder, polyvinylidene fluoride, carboxymethylcellulose (CMC), styrene-butadiene rubber (SBR), or the like can be used. Furthermore, a carbon material other than the amorphous carbon particles of the embodiment of the present invention or a graphite material may be added as an active material. Furthermore, as a conductive agent, for example, carbon black, carbon fibers, or the like may be added.

By mixing the amorphous carbon particles of the embodiment of the present invention and the binder, a negative electrode mixture coating material in a paste form is prepared, and the negative electrode mixture coating material is usually applied to one surface or both surfaces of a current collector to form a negative electrode mixture layer. In the preparation of the coating material, a common solvent may be used. The shape of the current collector used in the negative electrode is not particularly limited, and for example, the current collector may be foil-shaped; net-like, such as mesh or expanded metal; or the like. Examples of the current collector include copper, stainless steel, nickel, and the like.

[Positive Electrode]

As the material for the positive electrode (positive electrode active material), a material capable of doping/dedoping a sufficient amount of lithium ions is preferably selected. Examples of such a positive electrode active material include transition metal oxides, transition metal chalcogenides, vanadium oxides, lithium-containing compounds thereof, Chevrel compounds represented by general formula $M_xMo_6S_{8-y}$ (where X is a numerical value satisfying 0≤X≤4, Y is a numerical value satisfying 0≤Y≤1, and M represents a metal, such as a transition metal), activated carbon, activated carbon fibers, and the like. These may be used alone or in combination of two or more. For example, a carbonate, such as lithium carbonate, may be added into the positive electrode.

A lithium-containing transition metal oxide is a composite oxide of lithium and a transition metal, and may be a solid solution of lithium and two or more transition metals. A lithium-containing transition metal oxide is specifically represented by $LiM(1)_{1-p}M(2)_pO_2$ (where P is a numerical value satisfying 0≤P≤1, and M(1) and M(2) each represent at least one transition metal element), or $LiM(1)_{2-q}M(2)_qO_4$ (where Q is a numerical value satisfying 0≤Q≤1, and M(1) and M(2) each represent at least one transition metal element). Examples of the transition metal element represented by M include Co, Ni, Mn, Cr, Ti, V, Fe, Zn, Al, In, Sn, and the like, and Co, Fe, Mn, Ti, Cr, V, and Al are preferable.

Such a lithium-containing transition metal oxide can be obtained, for example, using oxides or salts of Li and a transition metal as starting materials, by mixing these starting materials according to the composition, and baking in an oxygen atmosphere in a temperature range of 600° C. to 1,000° C. The starting materials are not limited to oxides or salts, and synthesis is also possible using hydroxides or the like.

As the method for producing a positive electrode using such a positive electrode material, for example, a positive electrode mixture coating material in a paste form including the positive electrode material, a binder, and a conductive agent is applied to one surface or both surfaces of a current collector to form a positive electrode mixture layer. As the binder, the same binder exemplified in the negative electrode can be used. As the conductive agent, for example, a particulate carbon material, a fibrous carbon material, graphite, or carbon black can be used. The shape of the current collector is not particularly limited, and the same shape as that for the negative electrode can be used. As the material for the current collector, aluminum, nickel, a stainless steel foil, or the like can be usually used.

In the process of producing the negative electrode and the positive electrode, various additives, such as known conductive agents and binders, may be appropriately used.

[Electrolyte]

As the electrolyte, a common nonaqueous electrolyte containing a lithium salt, such as $LiPF_6$ or $LiBF_4$, as an electrolyte salt is used.

The nonaqueous electrolyte may be a liquid-state non-aqueous electrolyte solution or a polymer electrolyte, such as a solid electrolyte or gel electrolyte.

In the case where a liquid-state nonaqueous electrolyte solution is used, as the nonaqueous solvent, an aprotic organic solvent, such as ethylene carbonate, propylene carbonate, or dimethyl carbonate, can be used.

In the case where a polymer electrolyte is used, a matrix polymer gelled by a plasticizer (nonaqueous electrolyte solution) is included. Examples of the matrix polymer include ether polymers, such as polyethylene oxide or cross-linked product thereof, polymethacrylate-based polymers, polyacrylate-based polymers, and fluorine-based polymers, such as polyvinylidene fluoride and vinylidene fluoride-hexafluoropropylene copolymers. These may be used alone or as a mixture of two or more. Above all, from the viewpoint of oxidation-reduction stability and the like, fluorine-based polymers are preferable.

As the electrolyte salt and the nonaqueous solvent constituting the plasticizer (nonaqueous electrolyte solution) contained in the polymer electrolyte, those which can be used for a liquid-state electrolyte solution can be used.

In the lithium ion secondary battery of the embodiment of the present invention, usually, a separator, such as a microporous body of polypropylene or polyethylene or a multilayer structure thereof; a nonwoven fabric; or the like, is used. It is also possible to use a gel electrolyte. In this case, for example, a negative electrode containing the amorphous carbon particles of the embodiment of the present invention, a gel electrode, and a positive electrode are stacked in that order and the resulting stacked body is placed in a battery case.

The lithium ion secondary battery of the embodiment of the present invention may have any structure. The shape and configuration thereof are not particularly limited and, for example, may be selected arbitrarily from cylindrical type, square type, and coin type.

EXAMPLES

The present invention will be described specifically below with reference to examples. However, it is to be understood that the present invention is not limited thereto.

Example 1

First, 1,000 g of coal-tar pitch (actual carbon ratio: 60% by mass, quinoline insoluble (QI): 0.1% by mass) was placed in an autoclave equipped with an anchor stirrer, and heated to a fluid state. Then, 30 g of powder of natural graphite (average particle size: 4 µm), as graphite particles, was gradually added thereinto under stirring, and stirring was continued until uniform mixing was achieved.

After stirring, under a nitrogen stream, the mixture was heated to 320° C. in the autoclave, then compressed air was blown into the pitch while being circulated at 2 L/min, and heating was performed at 320° C. for five hours. Thus, the mixture was subjected to cross-linking treatment by the air-blowing reaction. Then, cooling was performed to room temperature and the content was taken out. The oxygen amount in the resulting content is shown in Table 1 below.

Next, the resulting content was pulverized using an atomizer, and the average particle size was adjusted to 12 µm. Infusibility-imparting treatment was performed in which the resulting powder was placed in a rotary furnace, heating was performed at a heating rate of 20° C./hr while circulating compressed air at 2 L/min, and the powder was held at 250° C. for three hours. After a product subjected to infusibility-imparting treatment was obtained, it was left to cool. The oxygen amount in the resulting product subjected to infusibility-imparting treatment is shown in Table 1 below.

Next, 100 g of the resulting product subjected to infusibility-imparting treatment was placed in a graphite container with a lid, under a nitrogen stream, heating was performed at a heating rate of 100° C./hr, and baking was performed at 1,150° C. for two hours. Thereby, carbon powder was obtained.

Examples 2 and 3

In Examples 2 and 3, carbon powder was obtained as in Example 1 except that the coal-tar pitch and graphite particles used were changed as shown in Table 1 below. The artificial graphite used in Example 3 was produced as described below.

(Production Method of Artificial Graphite)

By subjecting coal-tar pitch, as a raw material, to heat treatment at 450° C., mesocarbon microbeads were generated. Six times equivalent of tar middle oil serving as a solvent was added to the coal-tar pitch, and filtration was performed with a filter under a pressure of 2.0 ($kg/cm^2$) to separate mesocarbon microbeads. Next, the resulting mesocarbon microbeads were dried under normal pressure at 120° C. The dried product was heated in a cylindrical kiln in a nitrogen atmosphere at 350° C. for one hour, and then naturally cooled to room temperature to obtain a heat-treated product. Next, the heat-treated product was crushed by an atomizer, and then coarse powder (150 µm or more) was removed. The heat-treated mesocarbon microbeads were charged into the cylindrical kiln again, and heated in a nitrogen atmosphere at 320° C. for one hour. The resulting mesocarbon microbeads were further baked at 1,000° C. to obtain a baked product. The resulting baked product was pulverized. Next, graphitization was performed at 3,000° C. During the graphitization, particles did not fuse together, and the average particle size after the graphitization was 4 µm.

Example 4

1,000 g of coal-tar pitch (actual carbon ratio: 60% by mass, quinoline insoluble (QI): 0.1% by mass) was placed in an autoclave equipped with an anchor stirrer and, under a nitrogen stream, heated to 320° C. Then, compressed air was blown into the pitch while being circulated at 2 L/min, and heating was performed at 320° C. for five hours. Thus, cross-linking treatment by the air-blowing reaction was performed. At this stage, a paste obtained by mixing 30 g of powder of natural graphite (average particle size: 4 µm) and a small amount of coal-tar pitch, as graphite particles, was gradually added thereto under stirring, and stirring was continued until uniform mixing was achieved.

Then, cooling was performed to room temperature and the content was taken out. The oxygen amount in the resulting content is shown in Table 1 below.

Next, the resulting content was pulverized using an atomizer, and the average particle size was adjusted to 12 µm. Infusibility-imparting treatment was performed in which the resulting powder was placed in a rotary furnace, heating was performed at a heating rate of 20° C./hr while circulating compressed air at 2 L/min, and the powder was held at 250° C. for three hours. After a product subjected to infusibility-imparting treatment was obtained, it was left to cool. The oxygen amount in the resulting product subjected to infusibility-imparting treatment is shown in Table 1 below.

Next, 100 g of the resulting product subjected to infusibility-imparting treatment was placed in a graphite container with a lid, under a nitrogen stream, heating was performed at a heating rate of 100° C./hr, and baking was performed at 1,150° C. for two hours. Thereby, carbon powder was obtained.

Example 5

As in Example 1, 1,000 g of coal-tar pitch (actual carbon ratio: 60% by mass, quinoline insoluble (QI): 0.1% by mass) was placed in an autoclave equipped with an anchor stirrer, and heated to a fluid state. Then, 90 g of powder of natural graphite (average particle size: 4 µm), as graphite particles, was gradually added thereinto under stirring, and stirring was continued until uniform mixing was achieved.

After stirring, under a nitrogen stream, the mixture was heated to 320° C. in the autoclave, then compressed air was blown into the pitch while being circulated at 2 L/min, and heating was performed at 320° C. for five hours. Thus, the mixture was subjected to cross-linking treatment by the air-blowing reaction. Then, cooling was performed to room temperature and the content was taken out. The oxygen amount in the resulting content is shown in Table 1 below.

Next, the resulting content was pulverized using an atomizer, and the average particle size was adjusted to 12 µm. The resulting powder was placed in a mechanofusion system manufactured by Hosokawa Micron Corporation and treated at a peripheral speed of 15 m/s for 15 minutes. Infusibility-imparting treatment was performed in which the treated powder was placed in a rotary furnace, heating was performed at a heating rate of 20° C./hr while circulating compressed air at 2 L/min, and the powder was held at 250° C. for three hours. After a product subjected to infusibility-imparting treatment was obtained, it was left to cool. The oxygen amount in the resulting product subjected to infusibility-imparting treatment is shown in Table 1 below.

Next, 100 g of the resulting product subjected to infusibility-imparting treatment was placed in a graphite container with a lid, under a nitrogen stream, heating was performed at a heating rate of 100° C./hr, and baking was performed at 1,150° C. for two hours. Thereby, carbon powder was obtained.

Example 6

As in Example 1, 1,000 g of coal-tar pitch (actual carbon ratio: 60% by mass, quinoline insoluble (QI): 0.1% by mass) was placed in an autoclave equipped with an anchor stirrer, and heated to a fluid state. Then, 90 g of powder of natural graphite (average particle size: 4 µm), as graphite particles, was gradually added thereinto under stirring, and stirring was continued until uniform mixing was achieved.

After stirring, under a nitrogen stream, the mixture was heated to 320° C. in the autoclave, then compressed air was blown into the pitch while being circulated at 2 L/min, and heating was performed at 320° C. for five hours. Thus, the mixture was subjected to cross-linking treatment by the air-blowing reaction. Then, cooling was performed to room temperature and the content was taken out. The oxygen amount in the resulting content is shown in Table 1 below.

Next, the resulting content was pulverized using an atomizer, and the average particle size was adjusted to 12 µm. Infusibility-imparting treatment was performed in which the resulting powder was placed in a rotary furnace, heating was performed at a heating rate of 20° C./hr while circulating compressed air at 2 L/min, and the powder was held at 250° C. for three hours. After a product subjected to infusibility-imparting treatment was obtained, it was left to cool. The oxygen amount in the resulting product subjected to infusibility-imparting treatment is shown in Table 1 below.

Next, the resulting product subjected to infusibility-imparting treatment was placed in a mechanofusion system manufactured by Hosokawa Micron Corporation and treated at a peripheral speed of 18 m/s for 15 minutes. The treated powder was placed in a graphite container with a lid, under a nitrogen stream, heating was performed at a heating rate of 100° C./hr, and baking was performed at 1,150° C. for two hours. Thereby, carbon powder was obtained.

Example 7

1,000 g of coal-tar pitch (actual carbon ratio: 60% by mass, quinoline insoluble (QI): 0.1% by mass) was placed in an autoclave equipped with an anchor stirrer and, under a nitrogen stream, heated to 320° C. Then, compressed air was blown into the pitch while being circulated at 2 L/min, and heating was performed at 320° C. for five hours. Thus, cross-linking treatment by the air-blowing reaction was performed. At this stage, a paste obtained by mixing 30 g of powder of natural graphite (average particle size: 4 µm) and a small amount of coal-tar pitch, as graphite particles, was gradually added thereto under stirring, and stirring was continued until uniform mixing was achieved.

Then, cooling was performed to room temperature and the content was taken out. The oxygen amount in the resulting content is shown in Table 1 below.

Next, the resulting content was pulverized using an atomizer, and the average particle size was adjusted to 12 µm. The resulting powder was placed in a mechanofusion system manufactured by Hosokawa Micron Corporation and treated at a peripheral speed of 15 m/s for 15 minutes. Infusibility-imparting treatment was performed in which the treated powder was placed in a rotary furnace, heating was performed at a heating rate of 20° C./hr while circulating compressed air at 2 L/min, and the powder was held at 250° C. for three hours. After a product subjected to infusibility-imparting treatment was obtained, it was left to cool. The oxygen amount in the resulting product subjected to infusibility-imparting treatment is shown in Table 1 below.

Next, 100 g of the resulting product subjected to infusibility-imparting treatment was placed in a graphite container with a lid, under a nitrogen stream, heating was performed at a heating rate of 100° C./hr, and baking was performed at 1,150° C. for two hours. Thereby, carbon powder was obtained.

Example 8

1,000 g of coal-tar pitch (actual carbon ratio: 60% by mass, quinoline insoluble (QI): 0.1% by mass) was placed in an autoclave equipped with an anchor stirrer and, under a nitrogen stream, heated to 320° C. Then, compressed air was blown into the pitch while being circulated at 2 L/min, and heating was performed at 320° C. for five hours. Thus, cross-linking treatment by the air-blowing reaction was performed. At this stage, a paste obtained by mixing 30 g of powder of natural graphite (average particle size: 4 μm) and a small amount of coal-tar pitch, as graphite particles, was gradually added thereto under stirring, and stirring was continued until uniform mixing was achieved.

Then, cooling was performed to room temperature and the content was taken out. The oxygen amount in the resulting content is shown in Table 1 below.

Next, the resulting content was pulverized using an atomizer, and the average particle size was adjusted to 12 μm. Infusibility-imparting treatment was performed in which the resulting powder was placed in a rotary furnace, heating was performed at a heating rate of 20° C./hr while circulating compressed air at 2 L/min, and the powder was held at 250° C. for three hours. After a product subjected to infusibility-imparting treatment was obtained, it was left to cool. The oxygen amount in the resulting product subjected to infusibility-imparting treatment is shown in Table 1 below.

Next, the resulting product subjected to infusibility-imparting treatment was placed in a mechanofusion system manufactured by Hosokawa Micron Corporation and treated at a peripheral speed of 18 m/s for 15 minutes. The treated powder was placed in a graphite container with a lid, under a nitrogen stream, heating was performed at a heating rate of 100° C./hr, and baking was performed at 1,150° C. for two hours. Thereby, carbon powder was obtained.

Comparative Examples 1 and 2

In Comparative Examples 1 and 2, carbon powder was obtained as in Examples 1 and 2, respectively, except that graphite particles were not added to coal-tar pitch.

Comparative Example 3

In Comparative Example 3, carbon powder was obtained as in Comparative Example 1. However, when a negative electrode mixture paste was prepared, which will be described later, powder obtained by adding 5 parts by mass of natural graphite (average particle size: 5 μm) to 100 parts by mass of the carbon powder (hereinafter, simply referred to as the "carbon powder") was used as a negative electrode material.

<Evaluation>

(Evaluation of Carbon Powder after Baking)

In each of Examples and Comparative Examples, the carbon powder obtained by the baking was subjected to measurement of the average particle size (units of measure: μm), specific surface (units of measure: $m^2/g$), and true specific gravity (units of measure: $g/cm^3$) by the methods described above. The results thereof are shown in Table 1 below.

Next, using carbon powders obtained in Examples and Comparative Examples as a negative electrode material, coin-type secondary batteries (refer to FIG. 1) were fabricated, and various evaluations were performed. The results are shown in Table 2 below.

(Preparation of Negative Electrode Mixture Paste)

First, a negative electrode mixture paste was prepared using the resulting carbon powder as a negative electrode material. Specifically, carbon powder (95 parts by mass) and 12% N-methylpyrrolidinone solution of polyvinylidene fluoride (5 parts by mass in solid content) were placed in a planetary mixer, and stirring was performed at 100 rpm for 15 minutes. N-methylpyrrolidinone was further added thereto to adjust the solid content ratio to 60%, and stirring was continued for 15 minutes. Thereby, the negative electrode mixture paste was prepared.

(Fabrication of Working Electrode (Negative Electrode))

The negative electrode mixture paste thus prepared was applied onto a copper foil so as to obtain a uniform thickness. Furthermore, the copper foil was placed in a fan dryer, and the solvent was volatilized at 100° C. to form a negative electrode mixture layer. Next, the negative electrode mixture layer was pressed with a roller press and die-cut to a circular shape with a diameter of 15.5 mm. Thereby, a working electrode (negative electrode) including the negative electrode mixture layer closely attached to the current collector made of a copper foil was fabricated. Before evaluations were performed, drying was performed in vacuum at 100° C. for 8 hours or more.

(Electrode Press Formability (Electrode Density))

The working electrode thus fabricated was sandwiched between mirror plates having a certain area, and a pressure of 250 MPa was applied thereto for 20 seconds using a hand press. Then, the electrode density (units of measure: $g/cm^3$) was determined. The electrode density was determined by measuring the mass and thickness of the negative electrode mixture layer, followed by calculation. The press formability can be evaluated to be higher when the electrode density is higher.

(Conductivity of Electrode (Volume Resistivity))

The negative electrode mixture paste prepared as described above was applied to a film made of polyethylene terephthalate (manufactured by Toray Industries, Inc.), and pressing was performed at a pressure of 250 MPa. Three points of the film were measured using a resistance measuring device (manufactured by Mitsubishi Chemical Corporation), and the volume resistivity (units of measure: $\Omega \cdot cm$) was determined from the average value. The conductivity can be evaluated to be higher when the volume resistivity is lower.

(Preparation of Electrolyte Solution)

Electrolyte solution A: A nonaqueous electrolyte solution was prepared by dissolving $LiPF_6$ at a concentration of 1 $mol/dm^3$ in a mixed solvent obtained by mixing ethylene carbonate (33% by volume) and methyl ethyl carbonate (67% by volume).

Electrolyte solution B: A nonaqueous electrolyte solution was prepared by dissolving $LiPF_6$ at a concentration of 1 $mol/dm^3$ in propylene carbonate.

(Fabrication of Evaluation Battery)

Next, using the working electrode (negative electrode) fabricated as described above, a coin-type secondary battery for evaluation (may also be simply referred to as the "evaluation battery") shown in FIG. 1 was fabricated. FIG. 1 is a cross-sectional view showing the coin-type secondary battery for evaluation.

First, a lithium metal foil was pressed against a nickel net and die-cut into a circular shape with a diameter of 15.5 mm. Thereby, a disk-shaped counter electrode 4 formed of a lithium foil closely attached to a current collector 7a formed of a nickel net was fabricated.

Next, a separator 5 was interposed and stacked between a working electrode (negative electrode) 2 closely attached to a current collector 7b and the counter electrode 4 closely attached to the current collector 7a. Then, the working electrode 2 was placed in an outer cup 1, and the counter electrode 4 was placed in an outer can 3. The outer cup 1 and the outer can 3 were fitted to each other, and peripheries of the outer cup 1 and the outer can 3 were caulked through an insulating gasket 6 and sealed. Thereby, an evaluation battery was fabricated.

In the evaluation battery thus fabricated, the peripheries of the outer cup 1 and the outer can 3 are caulked through the insulating gasket 6 to form a sealed structure. In the sealed structure, as shown in FIG. 1, the current collector 7a, the counter electrode 4, the separator 5, the working electrode (negative electrode) 2, and the current collector 7b are stacked in that order on the inner surface of the outer can 3 toward the inner surface of the outer cup 1.

(Charge-Discharge Test)

The evaluation battery thus fabricated was subjected to a charge-discharge test at 25° C. in the manner described below. Note that, in this test, a process in which lithium ions were doped into carbon powder was defined as "charging", and a process in which lithium ions were dedoped from carbon powder was defined as "discharging".

First, constant current charging was performed at a current value of 0.9 mA until the circuit voltage reached 0 mV. At the moment when the circuit voltage reached 0 mV, switching was performed to constant voltage charging, and charging was continued until the current value reached 20 μA. From the conduction amount during this period, the charge capacity (may also be referred to as the "initial charge capacity") (units of measure: mAh/g) was obtained. Then, a pause of 120 minutes was taken. Next, constant current discharging was performed at a current value of 0.9 mA until the circuit voltage reached 1.5 V, and from the conduction amount during this period, the discharge capacity (may also be referred to as the "initial discharge capacity") (units of measure: mAh/g) was obtained. This process was defined as the first cycle.

Table 2 shows the initial discharge capacity, the initial charge-discharge efficiency, and the rapid discharge efficiency in the case where the electrolyte solution A was used.

(Initial Charge-Discharge Efficiency)

On the basis of the results of the charge-discharge test, the initial charge-discharge efficiency (units of measure: %) was obtained from the equation below in the case where the electrolyte solution A was used and in the case where the electrolyte solution B was used. The results are shown in Table 2.

Initial charge-discharge efficiency=(initial discharge capacity/initial charge capacity)×100

(Reactivity with Electrolyte Solution)

The reactivity with the electrolyte solution was evaluated by obtaining a difference between the charge-discharge loss in the case where the electrolyte solution A was used and the charge-discharge loss in the case where the electrolyte solution B was used.

In the case where the difference in charge-discharge loss was 15 mAh/g or less, reaction with the electrolyte solution B containing propylene carbonate was considered to be suppressed, which was evaluated to be "good". In the case where the difference in charge-discharge loss was more than that value, the reaction was not considered to be suppressed, which was evaluated to be "poor".

Note that, the charge-discharge loss (units of measure: mAh/g) was obtained from the following equation:

Charge-discharge loss=initial charge capacity−initial discharge capacity (Rapid Discharge Efficiency)

Furthermore, high-speed discharging was performed in the third cycle. Constant current charging was performed at a current value of 0.9 mA until the circuit voltage reached 0 mV. At the moment when the circuit voltage reached 0 mV, switching was performed to constant voltage charging, and charging was continued until the current value reached 20 μA. Then, a pause of 120 minutes was taken. Subsequently, constant current discharging was performed at a current value of 7.2 mA, which was eightfold higher, until the circuit voltage reached 1,500 mV, and the discharge capacity (may also be referred to as the "rapid discharge capacity") (units of measure: mAh/g) was obtained, and the rapid discharge efficiency (units of measure: %) was obtained from the equation below. Table 2 shows the rapid discharge efficiency in the case where the electrolyte solution A was used.

Rapid discharge efficiency=(rapid discharge capacity/initial discharge capacity)×100

TABLE 1

| | Graphite particles | | | | After cross-linking treatment Oxygen amount [mass %] | After infusibility-imparting treatment Oxygen amount [mass %] | After baking | | | Additive at the time of evaluation |
|---|---|---|---|---|---|---|---|---|---|---|
| | Pitch QI [mass %] | Graphite species | Addition amount [mass %] | Average particle size [μm] | | | Average particle size [μm] | Specific surface [m²/g] | True specific gravity [g/cm³] | |
| Example 1 | 0.1 | Natural graphite | 3 | 4 | 1 | 8.5 | 12 | 1.3 | 1.623 | — |
| Example 2 | 0 | Natural graphite | 10 | 4 | 1 | 7.2 | 10 | 1.7 | 1.672 | — |
| Example 3 | 0.2 | Artificial graphite | 10 | 4 | 1 | 7.1 | 5 | 3.2 | 1.672 | — |
| Example 4 | 0.1 | Natural graphite | 10 | 4 | 1 | 8.1 | 12 | 1.5 | 1.629 | — |
| Example 5 | 0.1 | Natural graphite | 10 | 4 | 1 | 7.3 | 12 | 1.4 | 1.671 | — |
| Example 6 | 0.1 | Natural graphite | 10 | 4 | 1 | 7 | 12 | 1.3 | 1.669 | — |
| Example 7 | 0.1 | Natural graphite | 10 | 4 | 1 | 6.8 | 9 | 1.8 | 1.678 | — |
| Example 8 | 0.1 | Natural graphite | 10 | 4 | 1 | 7.5 | 12 | 1.6 | 1.681 | — |

TABLE 1-continued

| | Graphite particles | | | After cross-linking treatment Oxygen amount [mass %] | After infusibility-imparting treatment Oxygen amount [mass %] | After baking | | | Additive at the time of evaluation |
|---|---|---|---|---|---|---|---|---|---|
| | Pitch QI [mass %] | Graphite species | Addition amount [mass %] | Average particle size [μm] | | | Average particle size [μm] | Specific surface [m²/g] | True specific gravity [g/cm³] | |
| Comparative Example 1 | 0.1 | — | — | — | 1 | 9.2 | 10 | 1.3 | 1.610 | — |
| Comparative Example 2 | 0 | — | — | — | 1 | 7.8 | 5 | 3.3 | 1.600 | — |
| Comparative Example 3 | 0.1 | — | — | — | 1 | 9.2 | 5 | 3.3 | 1.670 | Natural graphite |

TABLE 2

| | Electrode density (250 MPa) [g/cm³] | Volume resistivity [Ω·cm] | Initial discharge capacity (Electrolyte solution A) [mAh/g] | Initial charge-discharge efficiency [%] | | Reactivity with electrolyte solution | | Rapid discharge efficiency (Electrolyte solution A) [%] |
|---|---|---|---|---|---|---|---|---|
| | | | | Electrolyte solution A | Electrolyte solution B | Difference in charge-discharge loss | Evaluation | |
| Example 1 | 1.07 | 0.25 | 404 | 81.1 | 79.7 | 8.8 | good | 80.7 |
| Example 2 | 1.13 | 0.13 | 398 | 81.2 | 79.2 | 12.4 | good | 83.9 |
| Example 3 | 1.13 | 0.21 | 397 | 78.0 | 77.2 | 5.3 | good | 83.5 |
| Example 4 | 1.09 | 0.26 | 398 | 80.9 | 79.7 | 7.4 | good | 80.2 |
| Example 5 | 1.15 | 0.14 | 393 | 81.4 | 79.9 | 9.1 | good | 83.1 |
| Example 6 | 1.15 | 0.14 | 399 | 82.0 | 80.2 | 10.9 | good | 83.0 |
| Example 7 | 1.16 | 0.15 | 390 | 78.9 | 77.6 | 8.3 | good | 80.5 |
| Example 8 | 1.18 | 0.13 | 395 | 80.1 | 79.5 | 3.7 | good | 79.9 |
| Comparative Example 1 | 1.03 | 0.30 | 393 | 81.1 | 80.0 | 6.7 | good | 78.6 |
| Comparative Example 2 | 1.03 | 0.23 | 387 | 79.5 | 78.7 | 4.9 | good | 80.0 |
| Comparative Example 3 | 1.15 | 0.14 | 395 | 78.2 | —* | —* | poor | 83.1 |

*Note: Charging did not finish, and the loss was determined to be ∞.

When comparison is made between Examples 1 to 8 and Comparative Examples 1 and 2, in Examples 1 to 8, the true specific gravity is high, the electrode density is improved, the press formability is excellent, the volume resistivity is low, and thus conductivity is high, compared with Comparative Examples 1 and 2 in which graphite particles are not added.

Furthermore, when comparison is made between Examples 1 to 8 and Comparative Example 3, in Comparative Example 3, although the electrode density and the like are relatively good, the reactivity with electrolyte solution is evaluated to be "poor". The reason for this is believed to be that, in Comparative Example 3, in the case where the electrolyte solution B containing propylene carbonate is used, graphite particles added afterwards react with the electrolyte solution, and the battery is hardly charged.

In contrast, in Examples 1 to 8, the evaluation result of the reactivity with electrolyte solution is "good", and even in the case where the electrolyte solution B is used, charging and discharging can be performed.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for producing amorphous carbon particles, the method comprising:

adding and mixing graphite particles into a precursor of amorphous carbon, wherein the precursor is in a fluid state and the graphite particles are added to the precursor with stirring, and then cross-linking the precursor of amorphous carbon to obtain a first cross-linked product, wherein the crosslinking includes an air-blowing reaction at a temperature range of 320° C. to 380° C., or cross-linking a precursor of amorphous carbon and then adding and mixing graphite particles into the cross-linked precursor of amorphous carbon to obtain a second cross-linked product, wherein the crosslinking includes an air-blowing reaction at a temperature range of 320° C. to 380° C., and wherein the cross-linked precursor is in a fluid state and the graphite particles are added to the cross-linked precursor with stirring;

imparting infusibility to the first or second cross-linked product to obtain an infusibilized product; and baking the infusibilized product to obtain amorphous carbon particles, the amorphous carbon particles including the graphite particles and amorphous carbon which embeds the graphite particles.

2. The method for producing amorphous carbon particles according to claim 1, wherein an addition amount of the graphite particles is from 1% to 50% by mass based on an amount of the precursor of amorphous carbon.

3. The method for producing amorphous carbon particles according to claim 1, wherein an average particle size of the graphite particles is from 1 to 25 μm.

4. A method for producing amorphous carbon particles, the method comprising:
adding and mixing graphite particles into a precursor of amorphous carbon and then cross-linking the precursor of amorphous carbon to obtain a first cross-linked product, wherein the precursor is in a fluid state and the graphite particles are added to the precursor with stirring, or
cross-linking a precursor of amorphous carbon and then adding and mixing graphite particles into the cross-linked precursor of amorphous carbon to obtain a second cross-linked product, wherein the cross-linked precursor is in a fluid state and the graphite particles are added to the cross-linked precursor with stirring;
subjecting the first or second cross-linked product to mechanochemical treatment to obtain a mechanochemically treated product;
imparting infusibility to the mechanochemically treated product to obtain an infusibilized product; and
baking the infusibilized product to obtain amorphous carbon particles, the amorphous carbon particles including the graphite particles and amorphous carbon which embeds the graphite particles.

5. The method for producing amorphous carbon particles according to claim 4, wherein an addition amount of the graphite particles is from 1% to 50% by mass based on an amount of the precursor of amorphous carbon.

6. The method for producing amorphous carbon particles according to claim 4, wherein an average particle size of the graphite particles is from 1 to 25 μm.

7. The method for producing amorphous carbon particles according to claim 4, wherein the mechanochemical treatment is a treatment in which compressive force and shear force are applied at a same time to particles in the first or second cross-linked product.

8. A method for producing amorphous carbon particles, the method comprising:
adding and mixing graphite particles into a precursor of amorphous carbon and then cross-linking the precursor of amorphous carbon to obtain a first cross-linked product, wherein the precursor is in a fluid state and the graphite particles are added to the precursor with stirring, or
cross-linking a precursor of amorphous carbon and then adding and mixing graphite particles into the cross-linked precursor of amorphous carbon to obtain a second cross-linked product, wherein the cross-linked precursor is in a fluid state and the graphite particles are added to the cross-linked precursor with stirring;
imparting infusibility to the first or second cross-linked product to obtain an infusibilized product;
subjecting the infusibilized product to mechanochemical treatment to obtain a mechanochemically treated product; and
baking the mechanochemically treated product to obtain amorphous carbon particles, the amorphous carbon particles including the graphite particles and amorphous carbon which embeds the graphite particles.

9. The method for producing amorphous carbon particles according to claim 8, wherein an addition amount of the graphite particles is from 1% to 50% by mass based on an amount of the precursor of amorphous carbon.

10. The method for producing amorphous carbon particles according to claim 8, wherein an average particle size of the graphite particles is from 1 to 25 μm.

11. The method for producing amorphous carbon particles according to claim 8, wherein the mechanochemical treatment is a treatment in which compressive force and shear force are applied at a same time to particles in the infusibilized product.

12. The method for producing amorphous carbon particles according to claim 1, wherein the precursor comprises coal-based pitch, petroleum-based pitch, resins or mixtures thereof.

13. The method for producing amorphous carbon particles according to claim 4, wherein the precursor comprises coal-based pitch, petroleum-based pitch, resins or mixtures thereof.

14. The method for producing amorphous carbon particles according to claim 8, wherein the precursor comprises coal-based pitch, petroleum-based pitch, resins or mixtures thereof.

* * * * *